US012724973B2

(12) United States Patent
Sharma

(10) Patent No.: US 12,724,973 B2
(45) Date of Patent: Sep. 1, 2026

(54) ARTIFICIAL INTELLIGENCE (AI)-BASED INCLUSIVE PROMPT RECOMMENDATIONS AND FILTERING

(71) Applicant: Microsoft Technology Licensing, LLC, Redmond, WA (US)

(72) Inventor: Mrinal Kumar Sharma, Noida (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 149 days.

(21) Appl. No.: 18/632,170

(22) Filed: Apr. 10, 2024

(65) Prior Publication Data

US 2025/0322168 A1 Oct. 16, 2025

(51) Int. Cl.
*G06F 40/30* (2020.01)
*G06F 40/284* (2020.01)

(52) U.S. Cl.
CPC ............ *G06F 40/30* (2020.01); *G06F 40/284* (2020.01)

(58) Field of Classification Search
USPC ........................................................ 704/7–10
See application file for complete search history.

(56) References Cited

U.S. PATENT DOCUMENTS

2023/0316003 A1* 10/2023 Friedman ............. G06N 3/0442 704/9
2024/0354503 A1* 10/2024 Baruch ................. G06F 16/345
2025/0005523 A1* 1/2025 Katta .................... G06F 40/186
2025/0036695 A1* 1/2025 De Barros .............. G06F 9/451
2025/0068764 A1* 2/2025 Joshi ....................... G06F 40/20
2025/0139160 A1* 5/2025 Miller .................. H04N 21/251
2025/0259036 A1* 8/2025 Pillai .................... G06N 3/0455

OTHER PUBLICATIONS

"Reducing bias and improving safety in DALL•E 2", accessed on link https://openai.com/blog/reducing-bias-and-improving-safety-in-dall-e-2, Published on Jul. 22, 2022, 10 pages.
Aowal, et al., "Detecting Natural Language Biases with Prompt-based Learning", accessed on link https://arxiv.org/pdf/2309.05227.pdf, Published on Sep. 11, 2023, 10 pages.

(Continued)

*Primary Examiner* — Leonard Saint-Cyr
(74) *Attorney, Agent, or Firm* — NovoTechIP International PLLC

(57) ABSTRACT

An inclusive prompt recommendation system for generative AI utilizes an inclusive prompt recommendation model to provide recommendations of inclusive language to include in a prompt in order to promote inclusivity and diversity of generated content. The inclusive prompt recommendation model is trained to analyze input text to identify situations, such as gaming, storytelling, social media, projects or presentations for work/school, and like, where the user's intent is to generate an image or description of a person. The model is trained to identify patterns associated with ways users have historically incorporated inclusive terminology intext. The system can include an ethical filtering mechanism for ensuring that prompt recommendations do not have language that directly or indirectly promotes bias and/or stereotypes.

20 Claims, 8 Drawing Sheets

(56) References Cited

OTHER PUBLICATIONS

Dwivedi, et al., "Breaking the Bias: Gender Fairness in LLMs Using Prompt Engineering and In-Context Learning", Rupkatha Journal on Interdisciplinary Studies in Humanities, Published on Dec. 14, 2024, 18 pages.
Gupta, Ravi., "Decoding the Magic of Prompt Engineering in AI—A Layman's Guide", accessed on link https://www.linkedin.com/pulse/decoding-magic-prompt-engineering-ai-laymans-guide-gupta, Published on Sep. 21, 2023, 18 pages.
P, Suraksha., "Amazon, Microsoft lead efforts to tackle inherent biases in GenAI", accessed on link https://economictimes.indiatimes.com/tech/technology/amazon-microsoft-lead-efforts-to-reduce-large-language-model-biases/articleshow/105882590.cms, The Economic Times, Published on Dec. 11, 2023, 9 pages.
Rowsell, Julianna., "Reducing biased and harmful outcomes in generative AI", accessed on link https://adobe.design/stories/leading-design/reducing-biased-and-harmful-outcomes-in-generative-ai, Published on Jan. 21, 2024, 13 pages.

* cited by examiner

ARTIFICIAL INTELLIGENCE (AI)-BASED INCLUSIVE PROMPT RECOMMENDATIONS AND FILTERING

BACKGROUND

Generative artificial intelligence (AI) refers to a class of AI techniques and models designed to generate new content based on text descriptions, also referred to as prompts. A prompt describes the desired content, such as the features, characteristics, topics, etc. that a user wants to include in the generated output. Generative AI models are trained on vast amounts data to leverage natural language processing (NLP) to understand the input text and generate outputs, such as images and text, that reflect the style and characteristics of the data they were trained on.

One area of particular concern in the field of generative AI is the perpetuation of biases in generated outputs. Bias occurs when the generated output is not representative of the population. In AI systems, these biases can stem from the datasets and algorithmic processes used in the development of AI applications. If the training data used to develop AI algorithms is unrepresentative or contains inherent biases, the algorithms may learn and perpetuate those biases. Bias can also be introduced in the design and implementation of AI algorithms. This can occur through the choice of features, model architecture, or optimization criteria. Even if an AI system is unbiased initially, bias can be introduced during deployment due to factors such as differences in user interaction or feedback mechanisms.

Finding ways to mitigate or prevent the perpetuation of biases in generative AI systems and to promote inclusivity and diversity in generated output is always and worthwhile endeavor.

SUMMARY

In one general aspect, the instant disclosure presents a content generating system having a processor and a memory in communication with the processor wherein the memory stores executable instructions that, when executed by the processor alone or in combination with other processors, cause the content generating system to perform multiple functions. The function may include receiving an input text for a content request from a client application, the input text describing content to be generated by the content generating system based on the input text; delivering the input text to an inclusive prompt recommendation model as the text is being received, the inclusive prompt recommendation model being trained to process the input text to: determine at least one of an intent and a context of the content request via the inclusive prompt recommendation model; and generate at least one inclusive prompt recommendation based at least in part on the determined at least one of the intent and context, the inclusive prompt recommendation including text recommending at least one visible human trait, characteristics, or condition to include in the content to be generated; returning the inclusive prompt recommendation to the client application; receiving a prompt from the client application that includes the input text and the inclusive prompt recommendation; delivering the prompt to a content generating model, the content generating model being a model trained to generate output content based on the prompt; and returning the output content to the client application.

In yet another general aspect, the instant disclosure presents a method of generating images using a content generating system. The method includes receiving input text for a content request from a client application, the input text describing content to be generated by the content generating system for the content request; delivering the input text to an inclusive prompt recommendation model as the text is being received, the inclusive prompt recommendation model being trained to process the input text to: determine an intent/context of the content request; and generate at least one inclusive prompt recommendation based at least in part on the determined intent/context, the inclusive prompt recommendation including text recommending at least one visible human trait, characteristics, and/or condition to include in the content to be generated; returning the inclusive prompt recommendation to the client application; receiving a prompt from the client application that includes the input text and the inclusive prompt recommendation; delivering the prompt to a content generating model, the content generating being trained to generate output content based on the prompt; and returning the output content to the client application.

In a further general aspect, the instant application describes a non-transitory computer readable medium on which are stored instructions that when executed cause a programmable device to perform functions of receiving input text for a content request from a client application, the input text describing content to be generated by a content generating system for the content request; delivering the input text to an inclusive prompt recommendation model as the text is being received, the inclusive prompt recommendation model being trained to process the input text to: determine an intent/context of the content request; and generate at least one inclusive prompt recommendation based at least in part on the determined intent/context, the inclusive prompt recommendation including text recommending at least one visible human trait, characteristics, and/or condition to include in the content to be generated; returning the inclusive prompt recommendation to the client application; receiving a prompt from the client application that includes the input text and the inclusive prompt recommendation; delivering the prompt to a content generating model, the content generating being trained to generate output content based on the prompt; returning the output content to the client application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
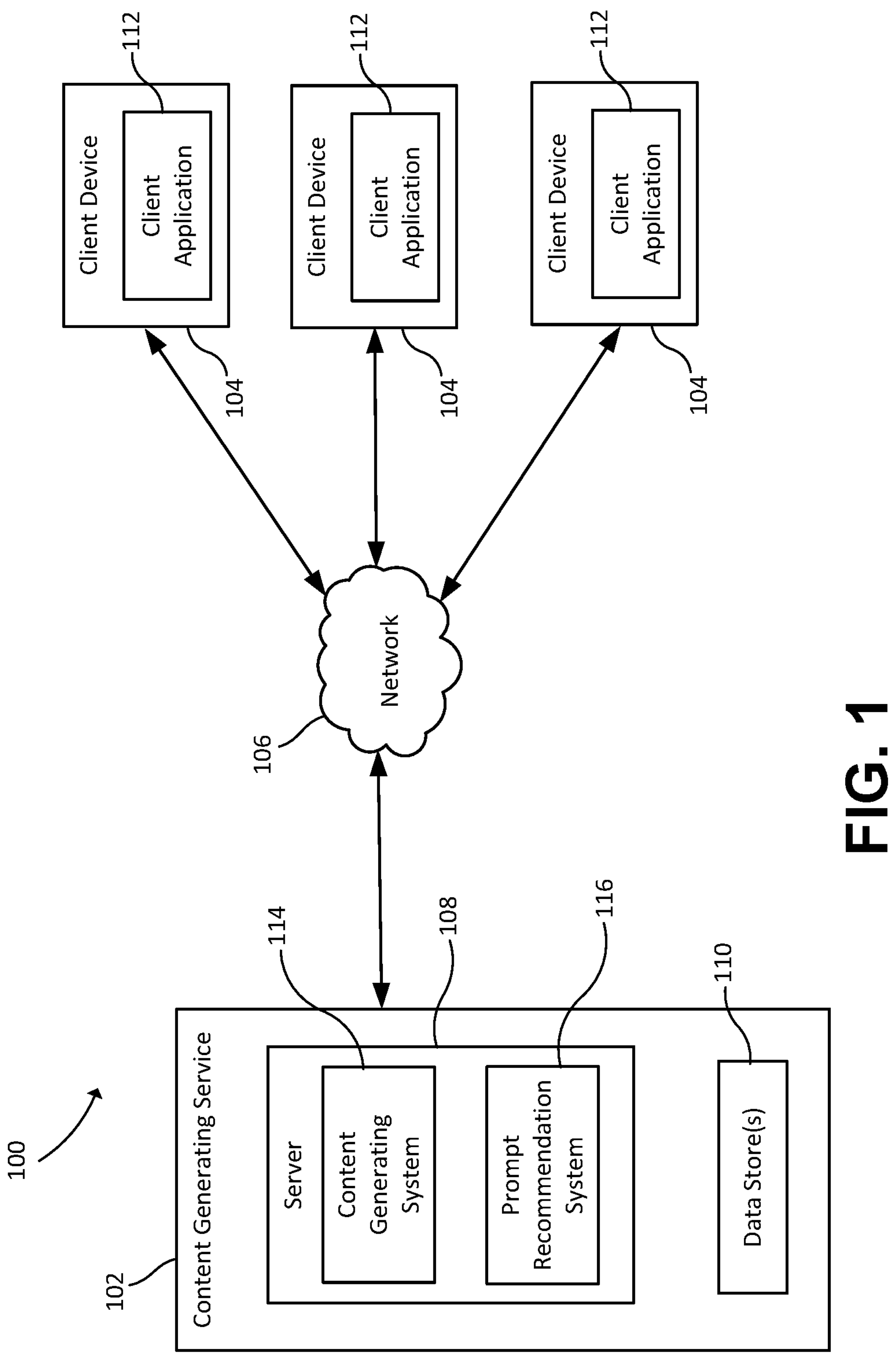
FIG. 1 is a diagram showing an example computing environment in which aspects of the disclosure may be implemented.

Due to the proliferation and widespread adoption of generative AI systems, it has become increasingly important to find ways to mitigate or prevent the perpetuation of biases and promote inclusivity and diversity in generated output so that the output is more representative of the human population as a whole. In AI systems, biases in generated content can arise when algorithms are trained on biased data and cannot extrapolate beyond that data. The error may be due to heterogeneous data, representation of complex data in simpler mathematical representations, wrong data, and algorithmic biases such as over- and under-fitting, the treatment of outliers, and data cleaning and imputation factors. The design and implementation of generative AI models can also introduce bias through the choice of features, model architecture, or optimization criteria. Bias can also be introduced during deployment through user interactions and feedback mechanisms.

To address the technical problems associated with mitigating or preventing biases in generative AI outputs, this description provides technical solutions in the form of an inclusive prompt recommendation mechanisms for generative AI systems that utilize an inclusive prompt recommendation model provide recommendations of inclusive language (i.e., traits, characteristics, conditions, etc.) to include in a prompt in order to promote inclusivity and diversity of generated content. As used herein, the term "inclusive prompt recommendations" refers to recommendations of human characteristics/traits to include in generated content, such as images and text, that would otherwise not be considered and/or included in generated output due to inherent biases in generative AI models. Examples of such human characteristics/traits that may be used in inclusive prompt recommendations include substantially any characteristic or trait of people or populations that may be underrepresented in training data and/or overlooked in society as a whole. These characteristics/traits can include visible characteristics such as vitiligo, heterochromia, orofacial clefts, dwarfism, visible deformities, loss or absence of a body part, alopecia, etc., and non-visible characteristics/traits, such as mental health disorders, conditions, defects, diseases, and the like, which do not have external features.

More inclusive/diverse content may not be warranted in all situations, such as requests that do not involve generating an image or description of a person. Generating inclusive prompt recommendations in these situations could be a waste of computing resources and network bandwidth. Accordingly, the inclusive prompt recommendation model is trained to analyze input text to identify situations where the user's intent is to generate an image or description of one or more people, and to only provide inclusive prompt recommendations for such requests. Examples of situations that are likely to involve generating an image or description of one or more people include gaming, storytelling, social media, projects or presentations for work/school, and like. As an example, a model can be trained to identify requests where the intent or context involves the creation of a presentation about facial conditions for medical training. In this case, the model understands that the keywords "facial conditions" means that the request involves generating an image or description of a human being.

The model may also be trained to analyze input text to determine which characteristic(s) to include in an inclusive prompt recommendation for a given request. Considering the previous example regarding "facial conditions," the model understands that the keywords "facial conditions" means that the request involves generating an image or description of a human being having a facial condition. In addition, the model knows that certain conditions, such as vitiligo and cleft lip/palette, correspond to facial conditions and can generate an inclusive prompt recommendation that suggests adding vitiligo and/or cleft lip/palette to the prompt. The model may also be trained to generate the recommendation with language specific to the intent of the request and that further promotes diversity and inclusivity. For example, when the intent is creating a presentation for medical training about facial conditions, the model can generate an inclusive prompt recommendation such as "Illustrate the characteristics of a cleft lip for a medical education module, emphasizing the importance of understanding and treating this condition."

As another example, the model may be trained to identify requests where a user's intent is to develop characters for a diverse and inclusive gaming experience, storytelling project, graphic novel, and the like. In this case, the model recognizes the terms "characters" and "gaming experience" and can generate an inclusive prompt recommendation that reads "Craft a character with vitiligo, showcasing the beauty of diverse skin patterns in the narrative." As another example, when the determined user intent is to create/customize a virtual avatar for a game or online platform, the model may suggest an inclusive prompt recommendation such as "Personalize my avatar with features like vitiligo to stand out and celebrate individuality in the virtual world." When the determined intent is to create characters for a diverse narrative and wants to address real-world conditions, the model may suggest an inclusive prompt recommendation such as "Craft a character with a cleft lip, portraying the challenges and strengths associated with this condition in the story." When the determined user intent is to plan a social media campaign to promote acceptance of facial diversity, the model may suggest an inclusive prompt recommendation, such as "Craft posts that highlight stories of resilience for individuals with cleft lip to spread awareness and foster acceptance."

In various implementations, the system can include an ethical filtering mechanism for ensuring that prompt recommendations do not have language that directly or indirectly promotes bias and/or stereotypes. An ethical filtering mechanism can include a machine learning model trained to identify recommendations including certain keywords and phrases (or that lack certain keywords or phrases) which can be construed as promote biases and/or stereotypes. In various implementations, the ethical filtering mechanism can remove the language that has been identified as potentially promoting biases or stereotypes, relace or add language that mitigates the potential of promoting biases or stereotypes, and/or simply prevent recommendations from being presented to users that have the potential to promote biases or stereotypes.

To ensure that the inclusive prompt recommendation system maintains satisfactory performance and/or is kept up to date with regard to acceptable image/language requirements, the system may include a dynamic adaption training system for training the model on a periodic or as needed basis to reinforce, adjust, and/or update learned behaviors. The training system uses training data based on user interactions and feedback pertaining the use of the system which has been collected over time. This training refines the model over time and can improve the system's understanding and performance.

The technical solutions described herein enable the identification of situations where more inclusive AI content generation is appropriate by detecting those situations through natural language processing (NLP) and providing inclusive prompt recommendations to promote the generation of diverse and inclusive content. In various implementations, inclusive prompt recommendation model comprises a generative language model, such as a Large Language Model (LLM), which tokenizes the input text and processes the tokenized text to identify content requests where an image or description of a person is being requested, to determine the intent/context behind the request (i.e., avatar customization, character creation for gaming, education material for a project or presentation, social media posts concerning a particular topic, etc.), and to generate recommendations which are appropriate for the determined intent/context.

The technical solutions described herein provide several benefits. For example, the solutions described herein enable users across platforms to access a more inclusive range of AI-generated content that reflects diverse human characteristics and underrepresented traits. The solutions also actively work to reduce biases and stereotypes in generated content by providing suggestions that consider a broader spectrum of human features and conditions. Platforms integrating these solutions gain an innovative edge by offering cutting-edge features that prioritize inclusivity. Unlike existing systems that primarily consider stylistic recommendations, the solutions promote the integration of inclusivity in the text prompts which marks a paradigm shift toward generating diverse and representative content by acknowledging the importance of inclusivity in the AI content generation landscape. In addition, by incorporating contextual understanding, dynamic feature representation, and a feedback loop for inclusivity, the solutions address the inherent biases present in AI systems and serve as an important step towards fostering more inclusive and representative portrayals in the content generated by AI, setting a precedent for responsible AI practices.

FIG. 1 shows an example computing environment 100 in which aspects of the disclosure may be implemented. Computing environment 100 includes a content generating service 102 and client devices 104 which communicate with each other via a network 106. The network 106 includes one or more wired, wireless, and/or a combination of wired and wireless networks. In embodiments, the network 106 includes one or more local area networks (LAN), wide area networks (WAN) (e.g., the Internet), public networks, private networks, virtual networks, mesh networks, peer-to-peer networks, and/or other interconnected data paths across which multiple devices may communicate. In embodiments, the network 106 is coupled to or includes portions of a telecommunications network for sending data in a variety of different communication protocols. In some implementations, the network 106 includes Bluetooth® communication networks or a cellular communications network for sending and receiving data including via short messaging service (SMS), multimedia messaging service (MMS), hypertext transfer protocol (HTTP), direct data connection, WAP, email, and the like.

The content generating service 102 is implemented as a cloud-based service or set of services. To this end, content generating service 102 includes at least one server 108 which is configured to provide computational and/or storage resources for implementing the content generating service 102. The server 108 is representative of any physical or virtual computing system, device, or collection thereof, such as, a web server, rack server, blade server, virtual machine server, or tower server, as well as any other type of computing system. In various implementations, the server 108 is implemented in a data center, a virtual data center, or some other suitable facility. Server 108 executes one or more software applications, modules, components, or collection thereof capable of providing the content generating service to clients, such as client devices 104. In various implementations, server 108 hosts data and/or content in connection with the content generating service 102 and makes this data and/or content available to the users of client devices 104 via the network 106. Program code, instructions, user data and/or content for the content generating service 102 is stored in a data store 110. Although a single server 108 and data store 110 are shown in FIG. 1, content generating service 102 may utilize any suitable number of servers and/or data stores.

Client devices 104 enable users to access the services provided by the content generating service 102 via the network 106. Client devices 104 can be any suitable type of computing device, such as personal computers, desktop computers, laptop computers, smart phones, tablets, gaming consoles, smart televisions and the like. Client devices 104 include at least one client application 112 that is configured to interact with the content generating service 102. In various implementations, client application 112 is a dedicated application installed on the client device and programmed to interact with one or more services provided by a cloud infrastructure. In some implementations, client application 112 is an add-on, extension, or the like that can be integrated into other applications to enable interaction with the content generating service 102. In some cases, client application 112 is a general-purpose application, such as a web browser, configured to access services and/or applications over the network 106.

Client applications 112 provide a user interface (UI) for receiving natural language input text, or prompts, from a user which describe content, such as imagery or writing topics, for the content generating service 102 to use in generating content. Prompts are provided to a prompt recommendation system which is configured to processes input text to generate recommendations of text to include in a prompt for the content generating service 102. Prompt recommendations can include stylistic prompt recommendations (i.e., recommendations for stylistic descriptions to add to prompts) and inclusive prompt recommendations (i.e., recommendations for inclusive characteristics/traits to add to prompts). A prompt recommendation system 116 may be implemented in the cloud, e.g., by content generating service 102 and/or as a separate service. A prompt recommendation system 118 may also be implemented as a local application installed on a client device. In some implementations, prompt recommendation functionality, such as stylistic prompt recommendations and inclusive prompt recommendations, may be divided between the cloud and the client device, such as one type of recommendation is generated in the cloud and the other type of recommendation is implemented locally.

Input text for a prompt is provided to a prompt recommendation system (116 and/or 118) which generates prompt recommendations (i.e., stylistic and/or inclusive prompt recommendations) which are returned to the client application and integrated into a prompt for the content generating service 102. Once prompts have been finalized, the finalized prompts are provided to the content generating service 102 over the network 106. The content generating service 102 includes a content generating system 114 which generates content, such as images and text, based on the prompt.

Figure 2:
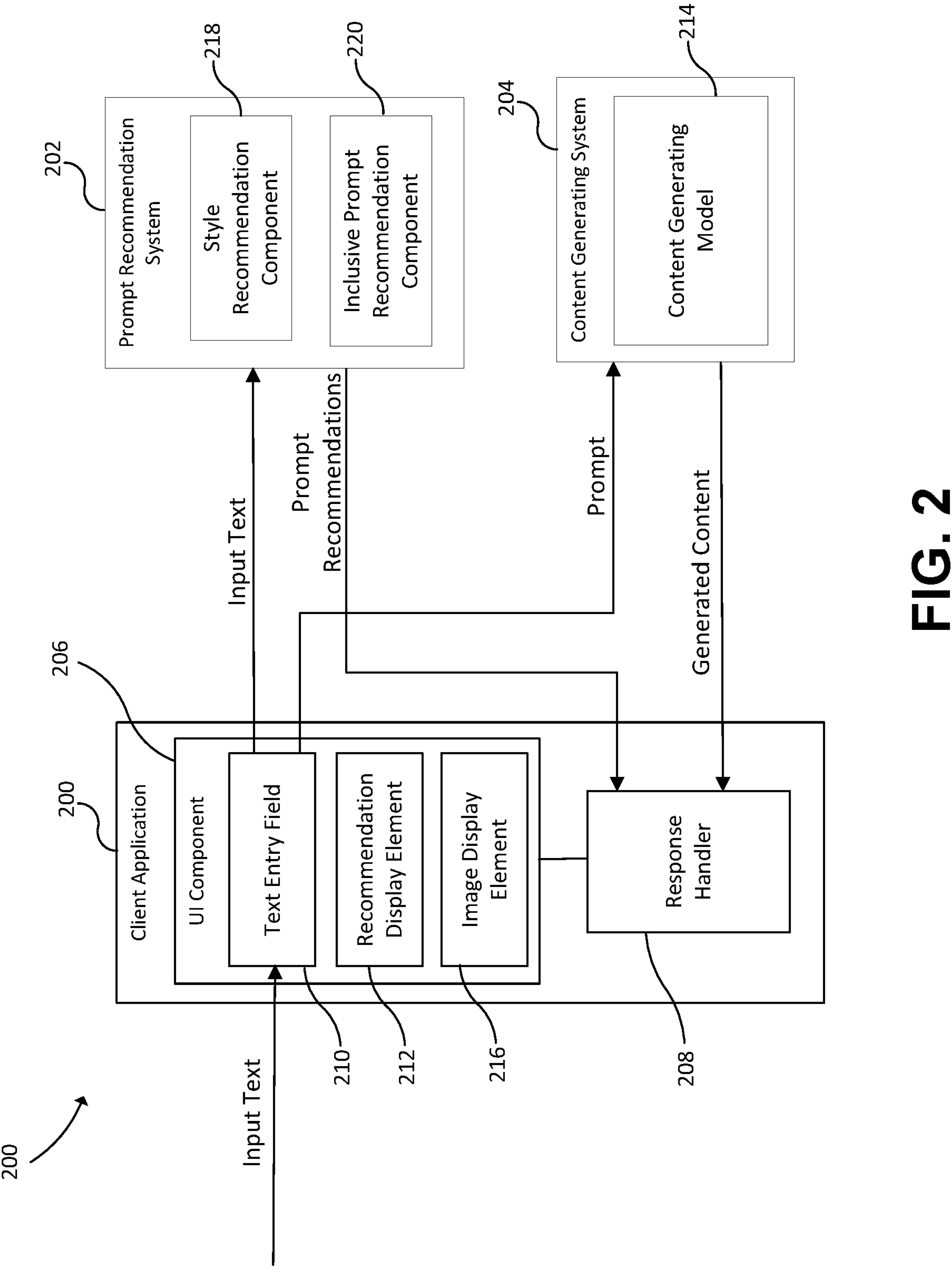
FIG. 2 shows an example implementation of a client application and a content generating system for a content generating service, such as the content generating service of FIG. 1.

An example implementation of a client application 200, a prompt recommendation system 202, and a content generating system 204 for the content generating service is shown in FIG. 2. Client application 200 includes a UI component 206 and a response handler 208. The UI component 206 includes a text entry field 210 for receiving the input text for a prompt from a user. The input text can request the generation of content, such as images and/or descriptions, related to a wide range of subjects and for a wide range of purposes. The client application 200 sends input text to the prompt recommendation system 202 as the text is being entered. The prompt recommendation system processes the input text to generate prompt recommendations which are returned to the response handler 208. As noted above, the prompt recommendation system 202 may be implemented in the cloud (e.g., by content generating service 102, another service, and/or as a stand-alone service) and/or locally at the client device.

The UI component 206 includes a prompt recommendation display element 212 for displaying prompt recommendations received from the prompt recommendation system 202. The recommendation display element 212 comprises a drop-down list or other suitable type UI control element. Prompt recommendations generated by the prompt recommendation system 202 are returned to the response handler 208 as they are generated (e.g., in real-time or substantially real-time). In turn, the response handler 208 causes returned prompt recommendations to be displayed in the recommendation display element 212 as they are received. The recommendation display element 212 enables prompt recommendations displayed therein to be selected for inclusion in the prompt. Recommendations can be selected via interaction with UI controls in any suitable manner (e.g., by clicking on them with a mouse cursor, touching them via a touchscreen, etc.). Selected recommendations may be automatically added to the text entry field 210.

Input text is sent to the prompt recommendation system until a sequence termination command is detected. In various implementations, the sequence termination command is generated in response to selection of a prompt recommendation and/or activation of a send button or other UI control. In some implementations, a sequence termination command can be generated in response to receiving a predetermined keystroke or combination of keystrokes, such as hitting a TAB or Enter key on a keyboard. Once the sequence termination command is detected, the client application 200 generates a prompt that includes the input text and any prompt recommendations which have been selected by the user. In some implementations, prompt recommendations may be automatically added to a prompt. The finalized prompt is then submitted to the content generating system 204. The content generating system 204 includes a generative AI model 214 that is trained to receive natural language prompts and generate new content, such as images or text, based on the prompts. Content generated by the content generating system 204 is returned to the response handler 208 of the client application 200, and the response handler 208 causes returned content to be displayed in a content display element 216 of the UI component 206. In some implementations, any suitable type of AI model or system may be used to generate content, such as Stable Diffusion models, Generative Adversarial Networks (GANs), Variational Autoencoders (VAEs), Recurrent Neural Networks (RNNs), Transformer-based models (e.g., LLMs), etc.

The prompt recommendation system 202 includes a style recommendation component 218 and an inclusive prompt recommendation component 220. The style recommendation component 218 is configured to process the input text to determine stylistic characteristics s to recommend for the content request. The style recommendation component 218 may include a machine learning model for processing the input text to determine styles to recommend for a content request. Style recommendations can include substantially any characteristic or attribute to use in depicting or describing content to be generated. In various implementations, the style recommendation model comprises any suitable type of machine learning model, such as Support Vector Machines (SVMs), Decision Trees, neural networks (e.g., LSTM or Transformer models). In some implementations, the style recommendation model comprises a Large Language Model (LLM). Examples of LLMs include, but are not limited to, generative models, such as Generative Pre-trained Transformer (GPT)-based models, e.g., GPT-3, GPT-4, ChatCPT, and the like.

Figure 3:
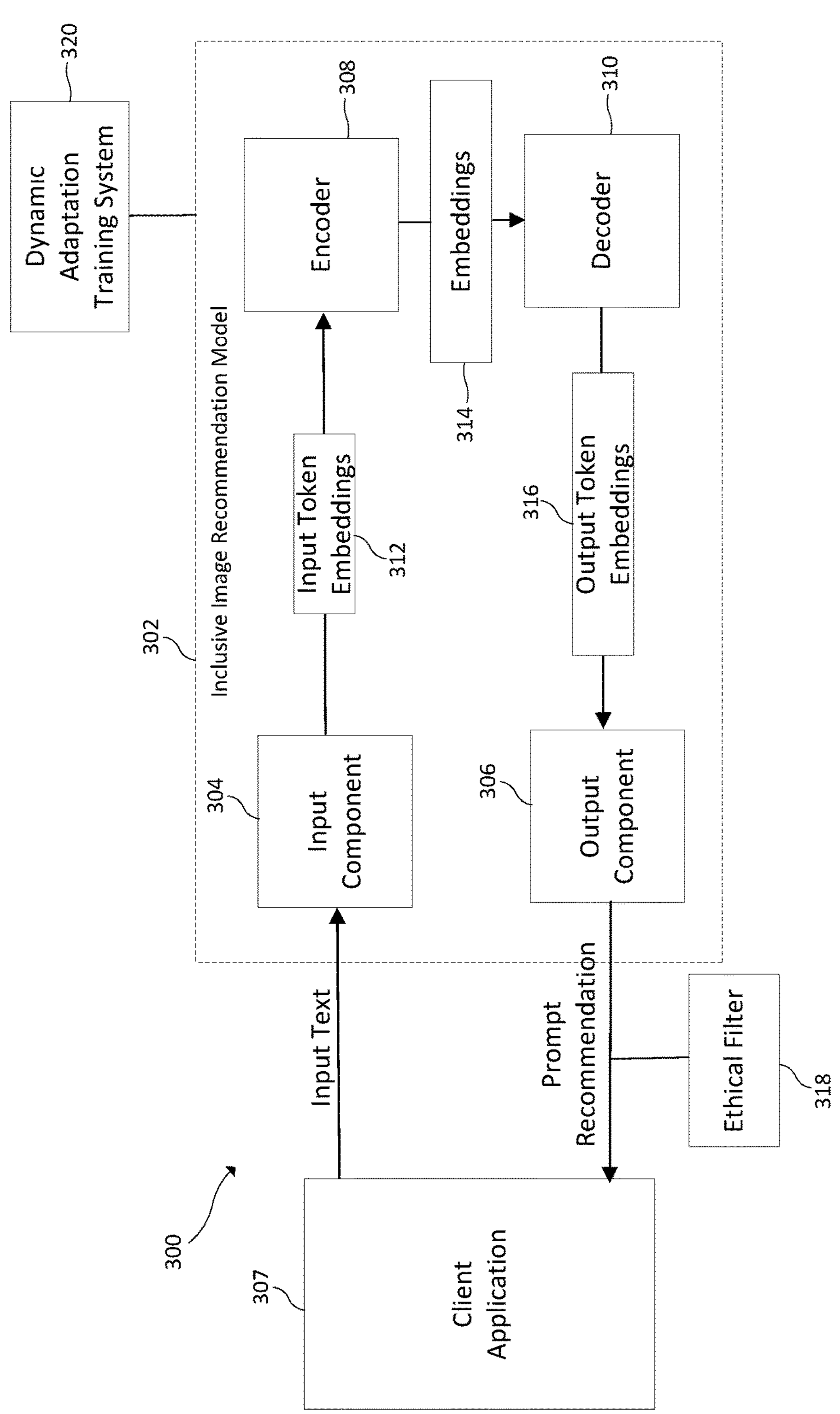
FIG. 3 shows an example implementation of an inclusive prompt recommendation component of the content generating system of FIG. 2.

The inclusive prompt recommendation component is configured to process the input text to determine when an image or description of a human is being requested, the intent/context behind the request (i.e., avatar customization, character creation for gaming, education material for a project or presentation, social media posts concerning a particular topic, etc.), and to generate recommendations which are appropriate for the determined intent/context. An example implementation of an inclusive prompt recommendation component 300 is shown in FIG. 3. The inclusive prompt recommendation component 300 includes an inclusive prompt recommendation model 302. The inclusive prompt recommendation model 302 includes an input component 304 which receives the input text from a client application 307 and output component 306 which returns generated content (i.e., prompt recommendations) to the client application 317.

In various implementations, the inclusive prompt recommendation model 302 comprises one or more machine learning models which have been pre-trained to tokenize text inputs and process the tokens to recognize context and classify a user's intent. The system aims to understand the purpose behind the input, distinguishing between various scenarios, such as artistic expression, character design, avatar customization, educational content creation, work/school projects, and the like. Machine learning models can include Support Vector Machines (SVM), Decision Trees, neural networks (e.g., LSTM or Transformer models) which are trained on labeled datasets to understand and classify the user's intent/context based on the tokenized input.

The inclusive prompt recommendation model 302 is trained to classify user's intent/context using a diverse dataset that includes examples of inclusive language and representation. The dataset covers conditions, such as vitiligo, cleft lip or palette, misaligned eyes, and alopecia, to name a few. Training allows the model to learn what these conditions are, whether or not to recommend each condition in a given circumstance, and how to recommend conditions (i.e., the language used) based on the input text. More specifically, the model is trained to identify patterns related to the inclusion of specific physical characteristics and patterns associated with the ways users have historically incorporated terms, such as "vitiligo" and "cleft," in different contexts. Machine learning frameworks like TensorFlow or PyTorch may be utilized to train the model on a diverse dataset. Transfer learning may be applied, leveraging pre-trained models like BERT or GPT, to adapt to the specific task of inclusive prompt recommendations. The training process involves adjusting model weights to capture patterns related to inclusive language and representation.

With the context and patterns recognized, the inclusive prompt recommendation model 302 generates prompt recommendations tailored to the user's intent. For example, if the context is character design, the model 302 might suggest the inclusion of unique features like "vitiligo" to promote diversity in the character's appearance. If the context is educational content related to facial conditions, the model might suggest the inclusion of unique features like "cleft lip or palette." In various implementations, transformer-based language models are used to generate prompt recommendations. The transformer architecture has been proven to be highly effective for a wide range of natural language processing tasks, such as text generation, translation, prediction, dialog systems, etc. In various implementations, the language model may comprise an LLM. Examples of LLMs include, but are not limited to, generative models, such as GPT-based models, e.g., GPT-3, GPT-4, ChatGPT, and the like. The model uses the recognized context and learned patterns to generate contextually relevant and inclusive suggestions. Beam search or other decoding techniques may be applied to improve the quality of generated suggestions.

In the example implementation of FIG. 3, the inclusive prompt recommendation model 302 has a transformer architecture including an encoder 308 and a decoder 310. The input component 304 processes the input text by tokenizing the text and then generating input token embeddings 312. The input token embeddings 312 are numerical representations (e.g., vectors) which map tokens to an embedding space which can be understood by the model 302. Positional encoding is included with the embedding that encodes the position of each token with respect to the other tokens in the prompt. The input token embeddings are provided to the encoder 308 as input. The encoder 308 is responsible for understanding and extracting relevant information from the input text. To this end, the encoder 308 includes a multi-head self-attention mechanism (not shown) which calculates three vectors, i.e., a query vector, a key vector, and a value vector, by multiplying the input embedding with weight matrices that are learned during training. The query vector represents the input token. The value vector includes the information in the input token, and the key vector is an indexing mechanism for the value vector. Once the query vector, key vector, and value vector have been determined, these vectors are used to calculate "attention scores" which represent the relevance of each word in an input sequence. More specifically, the attention scores indicate the similarity between the query and each key in the sequence, resulting in a weight for each token. In practice, the values of the probability distribution are multiplied by the attention scores which effectively reduces the probability for irrelevant tokens while maintaining the values of relevant tokens. The output (i.e., the token having the highest probability) of the current token prediction iteration is used as the query for the next iteration.

The encoder outputs encoded representations (i.e., embeddings 314) which incorporate the attention scores for each token. These encoded representations are fed to the decoder 310. The decoder 310 is responsible for generating a sequence of output token embeddings 316. The decoder 310 has a multi-head self-attention mechanism that is masked to prevent the decoder from considering future output predictions when generating the current output. The output of the decoder 310 is a probability distribution which describes all the possible token embeddings and the likelihood that the current output token is the next token for the output sequence. The token embedding having the highest probability is then selected for the output sequence. The input prompt along with the current and any previous token predictions are fed back into the model as input to help predict the next token in the sequence. This approach to token prediction/generation is called autoregressive because each generated token is also used as input for generating future tokens.

Depending on what the model is trained to do, the output of the decoder can be a determination of the intent/context, a determination of the type of intent/context (i.e., character design, avatar customization, educational content creation, etc.), and/or the text for a prompt recommendation (i.e., "Personalize your avatar with features like Vitiligo to stand out and celebrate individuality in the virtual world."). The sequence of output token embeddings is provided to the output component 306. The output component 306 converts the sequence of output token embeddings to a text string which corresponds to an inclusive prompt recommendation, and the output component 306 returns the prompt recommendation to the client application 307.

To maintain ethical standards, the inclusive prompt recommendation component 300 may include an ethical filter component 318 which monitors the recommendations to ensure that recommendations avoid perpetuating stereotypes or biases. Additionally, the inclusive prompt recommendation component 300 may include a dynamic adaptation training system 320 which is configured to perform dynamic adaptation training of the inclusive prompt recommendation model 302. The training system 320 collects user interaction data and feedback data pertaining to the use of inclusive prompt recommendation model and generates training data to use to reinforce, adjust, and/or update the model 302.

Figure 4:
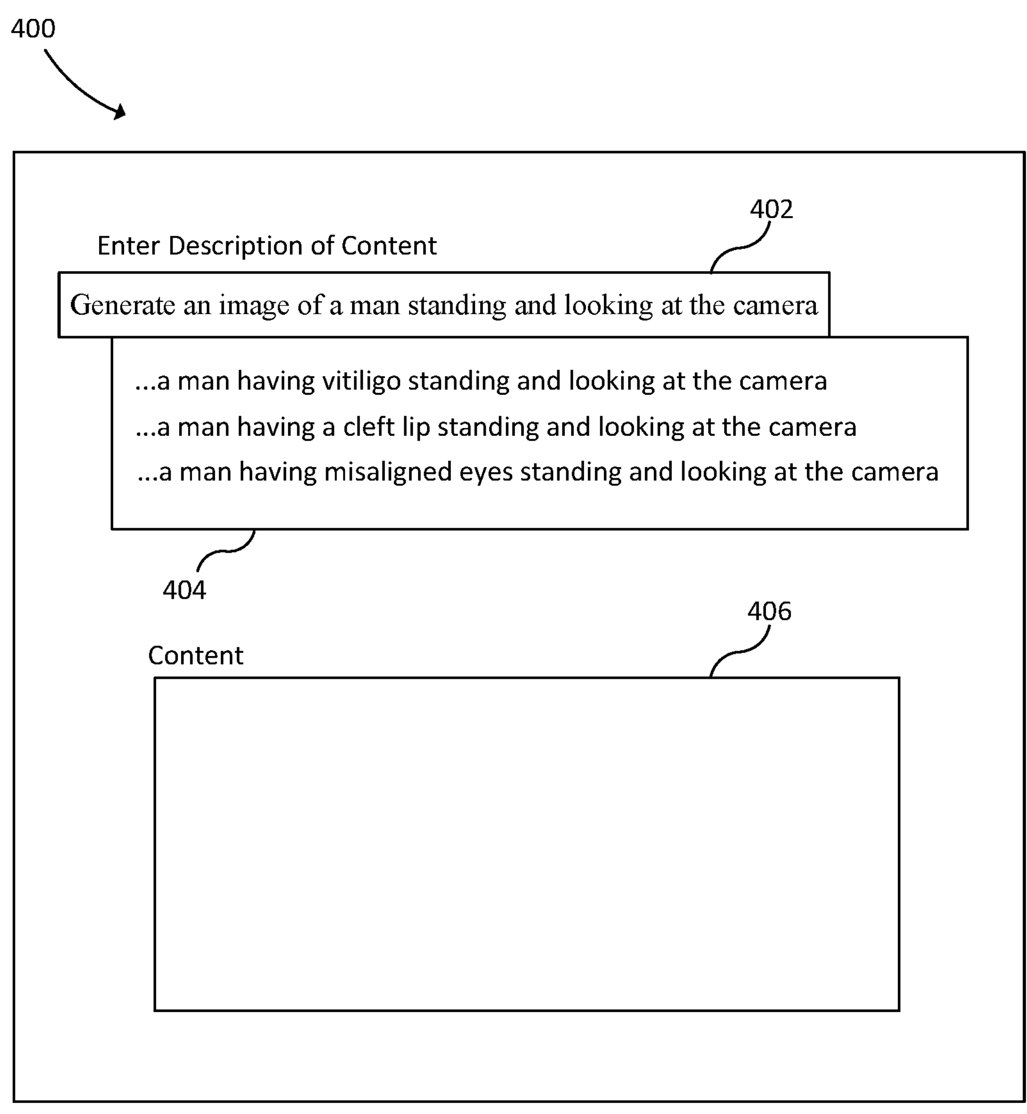
FIG. 4 shows an example implementation of a user interface of a client application for the content generating service of FIG. 1.

An example implementation of a UI component 400 for a client application of a content generating service is shown in FIG. 4. The UI component 400 includes a text entry field 402 and a recommendation display element 404. In this example, a user has entered the text "Generate an image of a man standing and looking at the camera." Image recommendations provided by the inclusive prompt recommendation component are displayed in the recommendation display element 404. In this example, the inclusive prompt recommendation component has generated prompt recommendations based on the input text which include " . . . a man having vitiligo standing and looking at the camera", " . . . a man having a cleft lip standing and looking at the camera," and "... a man having misaligned eyes standing and looking at the camera."

Figure 5A:
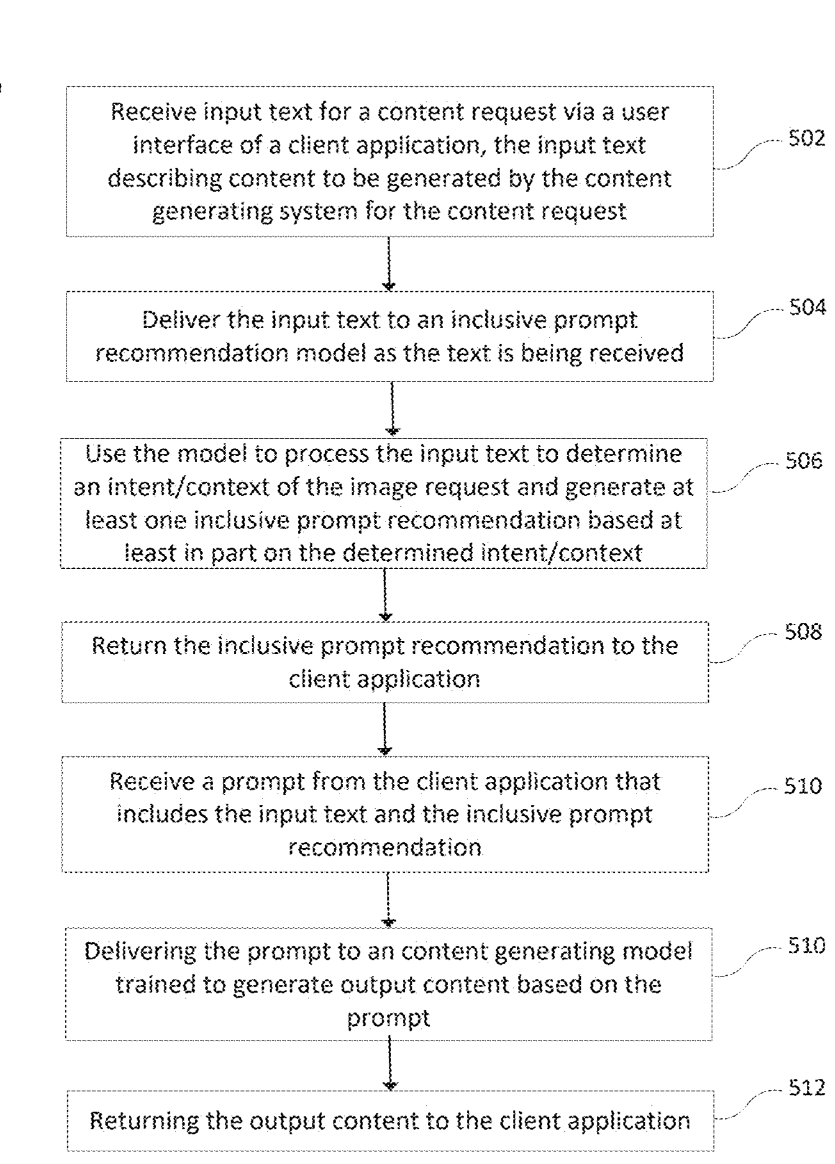
FIG. 5A shows a flowchart of a method of generating inclusive prompt recommendations for the content generating service of FIG. 1 using an online prompt recommendation system.

FIG. 5A shows a flowchart of an example method 500 of providing inclusive prompt recommendations for a content generating system using an online prompt recommendation system. The method 500 begins with receiving an input text for a content request from a client application, the input text describing content to be generated by the content generating system for the input request (block 502). The input text is provided to an inclusive prompt recommendation model as the text is being received (block 504). The model is trained to process the input text to determine an intent/context of the content request and to generate at least one inclusive prompt recommendation based at least in part on the determined intent/context, the inclusive prompt recommendation including text recommending at least one visible human trait, characteristics, and/or condition to include in the content to be generated (block 506). The inclusive prompt recommendation is returned to the client application (block 508). A prompt including the input text and the inclusive prompt recommendation is received from the client application (block 510). The prompt is delivered to a content generating model trained to generate output content based on the prompt (block 512). The output content is then returned to the client application.

Figure 5B:
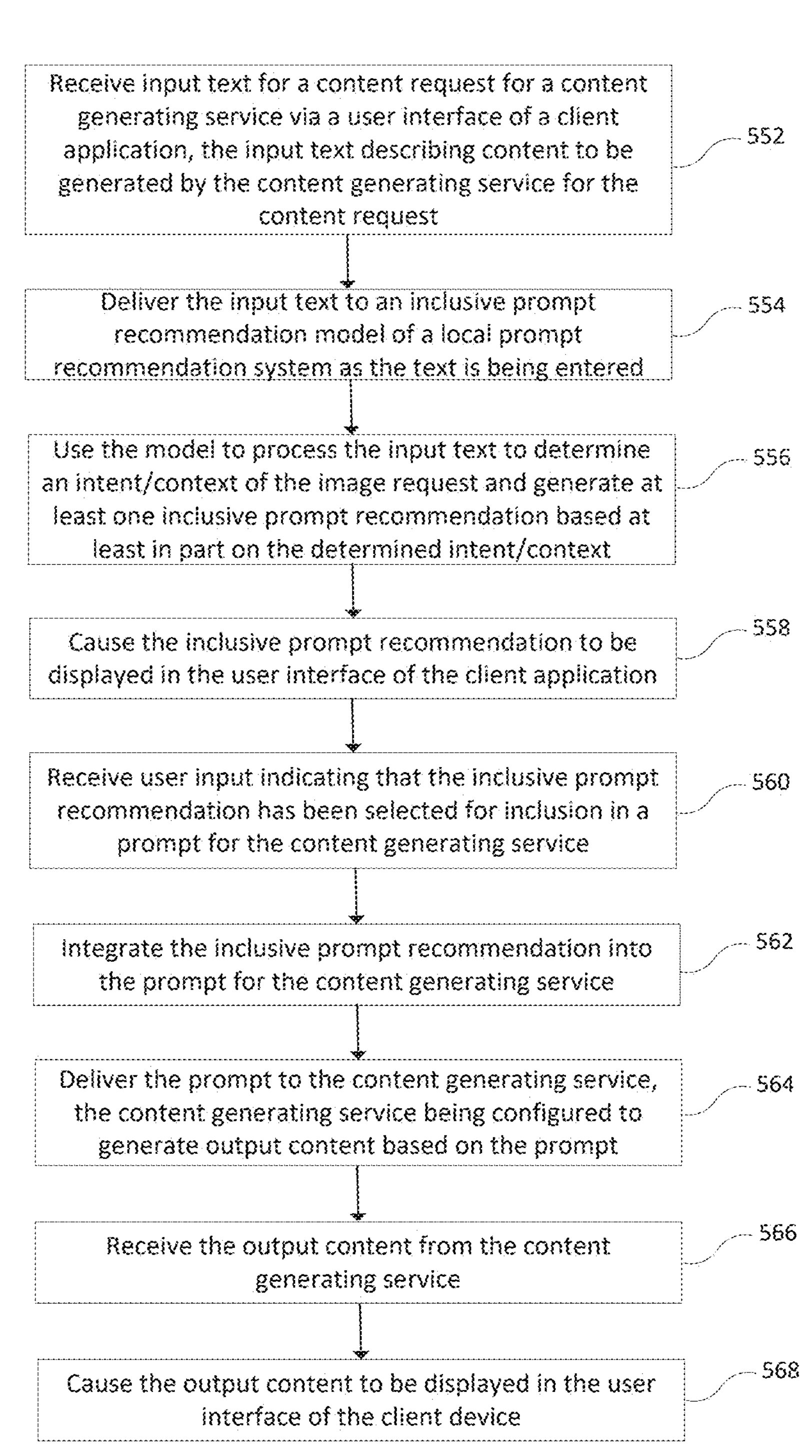
FIG. 5B shows a flowchart of a method of generating inclusive prompt recommendations for the content generating service of FIG. 1 using a local prompt recommendation system.

FIG. 5B shows a flowchart of an example method 550 of providing inclusive prompt recommendations for a content generating system using a local prompt recommendation system. The method 550 begins with receiving input text for a content request via a user interface of a client application, the input text describing content to be generated by the content generating system for the content request (block 552). The input text is then provided to an inclusive prompt recommendation model of a local prompt recommendation system as the text is being received (block 554). The model is trained to process the input text to determine an intent/context of the content request and to generate at least one inclusive prompt recommendation based at least in part on the determined intent/context, the inclusive prompt recommendation including text recommending at least one visible human trait, characteristics, and/or condition to include in the content to be generated (block 556). The inclusive prompt recommendation is then displayed in the user interface of the client application (block 558). User input indicating that the inclusive prompt recommendation has been selected for inclusion in a prompt for the content generating service is then received from the client application (block 560). The inclusive prompt recommendation is then integrated into the prompt for the content generating service (block 562). The finalized prompt is then delivered to the content generating service, the content generating service being configured to generate output content based on the prompt (block 564). The output content is received from the content generating service (block 566) and displayed in the user interface of the client application (block 568).

Figure 6:
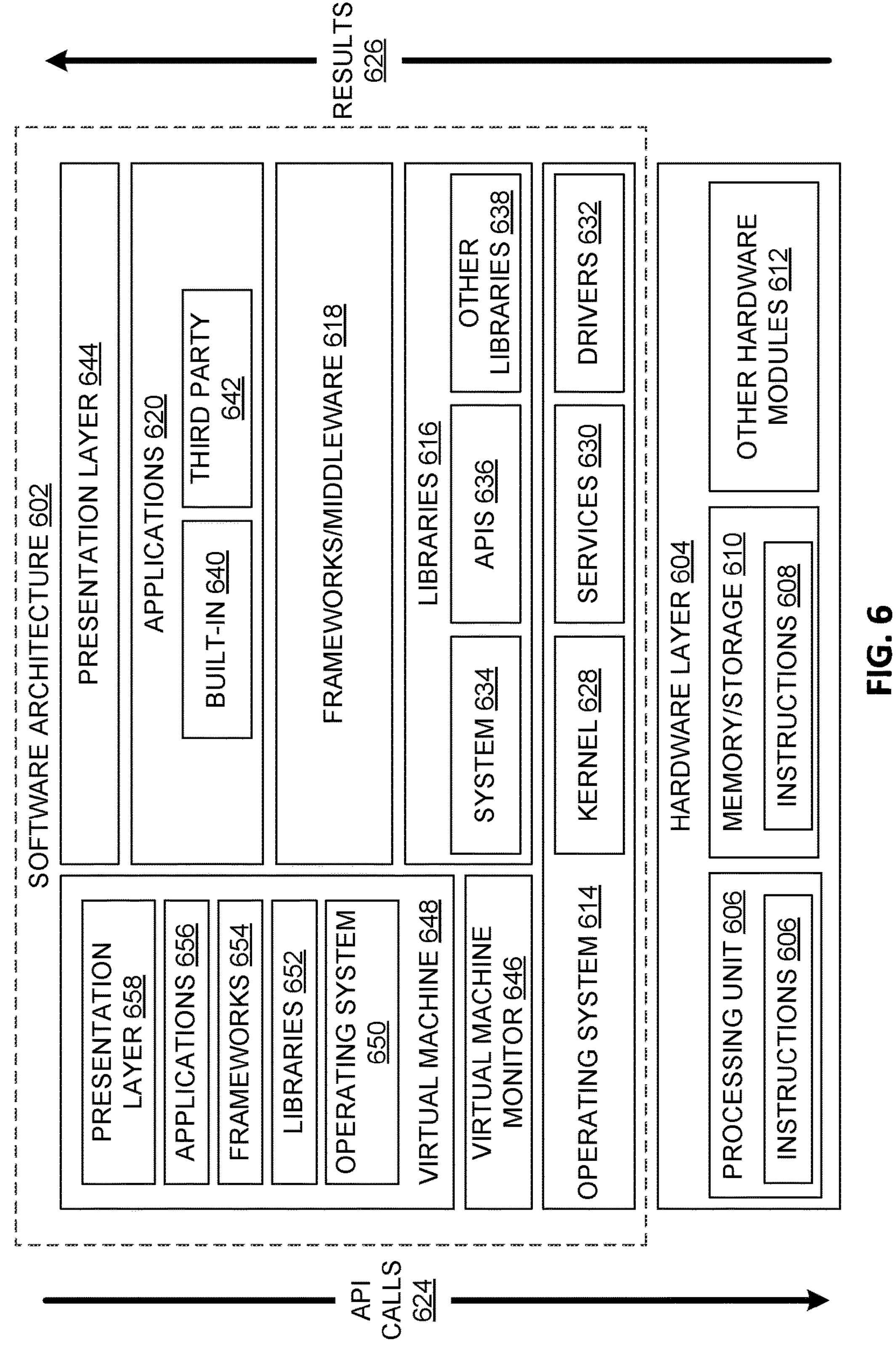
FIG. 6 is a block diagram showing an example software architecture, various portions of which may be used in conjunction with various hardware architectures herein described, which may implement any of the described features.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks/middleware 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks/middleware 618 may provide various graphic user interface (GUI)

functions, high-level resource management, or high-level location services. The frameworks/middleware 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks/middleware 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
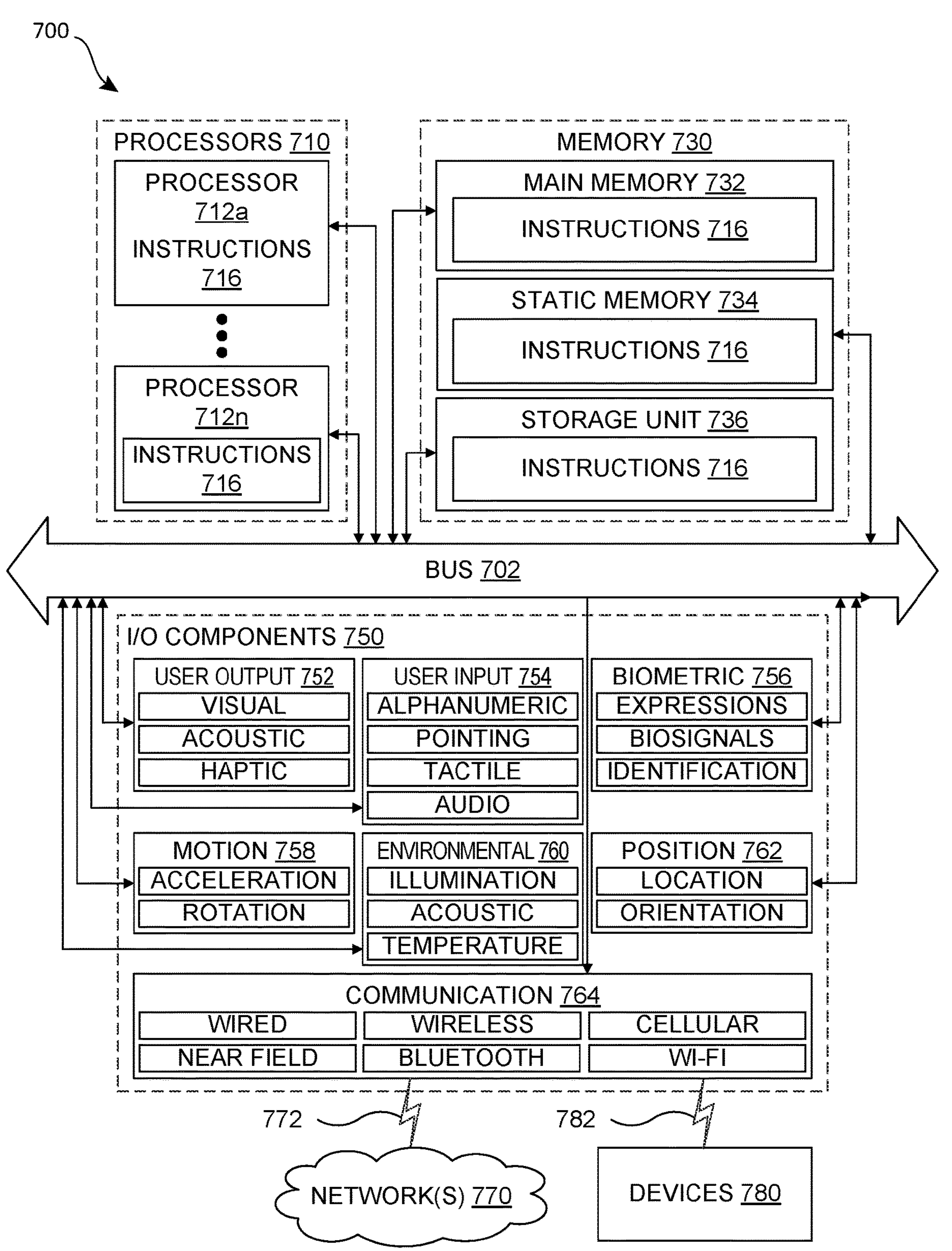
FIG. 7 is a block diagram showing components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712*a* to 712*n* that may execute the instructions 716 and process data. In some examples, one or more processors 710 may execute instructions provided or identified by one or more other processors 710. The term "processor" includes a multicore processor including cores that may execute instructions contemporaneously. Although FIG. 7 shows multiple processors, the machine 700 may include a single processor with a single core, a single processor with multiple cores (for example, a multicore processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760, and/or position components 762, among a wide array of other physical sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 764, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

What is claimed is:

1. A data processing device comprising:

a processor; and a memory in communication with the processor, the memory comprising executable instructions that, when executed by the processor alone or in combination with other processors, cause the data processing device to perform functions of:

receiving an input text for a content request prompt from a client application via a network, the input text describing content to be generated by a content generating service based on the input text;

before sending the content request prompt to the content generating service, delivering the input text to an inclusive prompt recommendation model as the input text is being received, the inclusive prompt recommendation model being trained to process the input text to:

determine an intent of the content request prompt via the inclusive prompt recommendation model; and generate at least one inclusive prompt recommendation based at least in part on the determined the intent, the inclusive prompt recommendation including text recommending at least one visible human trait, characteristic, or condition to include in the content to be generated;

returning the inclusive prompt recommendation to the client application;

receiving a completed content request prompt from the client application that includes the input text and the inclusive prompt recommendation;

delivering the completed content request prompt to a content generating model of the content generating service, the content generating model being a model trained to generate output content based on the prompt; and returning the output content to the client application.

2. The data processing device of claim 1, wherein the at least one visible human trait, characteristic, and/or condition included in the inclusive prompt recommendation includes at least one of vitiligo, misaligned eyes, cleft lip/palate, heterochromia, and alopecia.

3. The data processing device of claim 1, wherein the intent of the content request prompt includes at least one of avatar creation, character creation, education content creation, and social media post creation.

4. The data processing device of claim 1, wherein the inclusive prompt recommendation model comprises a Large Language Model (LLM) which tokenizes the input text and processes the tokenized input text to generate the inclusive prompt recommendation.

5. The data processing device of claim 1, further comprising:

performing an ethical filter operation on inclusive prompt recommendations generated by the inclusive prompt recommendation model to detect and remove language in the inclusive prompt recommendations that does not satisfy predetermined ethical standards.

6. The data processing device of claim 1, further comprising:

collecting user interaction data and feedback data pertaining to use of the inclusive prompt recommendation model;

generating updated training data for the inclusive prompt recommendation model to reinforce, adjust, and/or update the inclusive prompt recommendation model; and training the inclusive prompt recommendation model with the updated training data.

7. The data processing device of claim 1, wherein the inclusive prompt recommendation model is trained to recognize patterns in prompts associated with inclusion of the at least one visible human trait, characteristic, and/or condition.

8. A data processing device comprising:

a processor; and a memory in communication with the processor, the memory comprising executable instructions that, when executed by the processor alone or in combination with other processors, cause the data processing device to perform functions of:

receiving input text for a content request prompt for a content generating service via a user interface of a client application, the input text describing content to be generated by the content generating service based on the input text;

before sending the content request prompt to the content generating service, delivering the input text to an inclusive prompt recommendation model of a local prompt recommendation system, the inclusive prompt recommendation model being trained to process the input text to:

determine an intent of the content request prompt via the inclusive prompt recommendation model;

generate an inclusive prompt recommendation based at least in part on the determined intent, the inclusive prompt recommendation including text recommending at least one visible human trait, characteristic, or condition to include in the content to be generated; and return the inclusive prompt recommendation to the client application;

causing the inclusive prompt recommendation to be displayed in the user interface of the client application;

receiving user input indicating that the inclusive prompt recommendation has been selected for inclusion in the content request prompt for the content generating service;

in response to receiving the user input indicating that the inclusive prompt recommendation has been selected, integrating the inclusive prompt recommendation into the content request prompt for the content generating service;

detecting a sequence termination command;

in response to detecting the sequence termination command, generating a completed content request prompt that includes at least the input text and the inclusive prompt recommendation;

delivering the completed content request prompt to the content generating service, the content generating service being configured to generate output content based on the completed content request prompt;

receiving the output content from the content generating service; and causing the output content to be displayed in the user interface of the client application.

9. The data processing device of claim 8, wherein the at least one visible human trait, characteristic, and/or condition included in the inclusive prompt recommendation includes at least one of vitiligo, misaligned eyes, cleft lip/palate, heterochromia, and alopecia.

10. The data processing device of claim 8, wherein the intent of the content request prompt includes at least one of avatar creation, character creation, education content creation, and social media post creation.

11. The data processing device of claim 8, wherein the inclusive prompt recommendation model comprises a Large Language Model (LLM) which tokenizes the input text and processes the tokenized input text to generate the inclusive prompt recommendation.

12. The data processing device of claim 8, further comprising:

performing an ethical filter operation on inclusive prompt recommendations generated by the inclusive prompt recommendation model to detect and remove language in the inclusive prompt recommendations that does not satisfy predetermined ethical standards.

13. The data processing device of claim 8, further comprising:

collecting user interaction data and feedback data pertaining to use of the inclusive prompt recommendation model;

generating updated training data for the inclusive prompt recommendation model to reinforce, adjust, and/or update the inclusive prompt recommendation model; and training the inclusive prompt recommendation model with the updated training data.

14. The data processing device of claim 8, wherein the inclusive prompt recommendation model is trained to recognize patterns in prompts associated with inclusion of the at least one visible human trait, characteristic, and/or condition.

15. A method for a content generating system, the method comprising:

receiving input text for a content request prompt from a client application, the input text describing content to be generated by a content generating system for the content request;

before sending the content request prompt to the content generating system, delivering the input text to an inclusive prompt recommendation model as the text is being received, the inclusive prompt recommendation model being trained to process the input text to:

determine an intent/context of the content request; and generate at least one inclusive prompt recommendation based at least in part on the determined intent/context, the inclusive prompt recommendation including text recommending at least one visible human trait, characteristic, and/or condition to include in the content to be generated;

returning the inclusive prompt recommendation to the client application;

receiving a completed content request prompt from the client application that includes the input text and the inclusive prompt recommendation;

delivering the completed content request prompt to a content generating model of the content generating system, the content generating model being trained to generate output content based on the prompt;

returning the output content to the client application.

16. The method of claim 15, wherein the at least one visible human trait, characteristic, and/or condition included in the inclusive prompt recommendation includes at least one of vitiligo, misaligned eyes, cleft lip/palate, heterochromia, and alopecia.

17. The method of claim 15, wherein the intent/context of the content request prompt includes at least one of avatar creation, character creation, education content creation, and social media post creation.

18. The method of claim 15, further comprising:

performing an ethical filter operation on inclusive prompt recommendations generated by the inclusive prompt recommendation model to detect and remove language in the inclusive prompt recommendations that does not satisfy predetermined ethical standards.

19. The method of claim 15, further comprising:

collecting user interaction data and feedback data pertaining to use of the inclusive prompt recommendation model;

generating updated training data for the inclusive prompt recommendation model to reinforce, adjust, and/or update the inclusive prompt recommendation model; and training the inclusive prompt recommendation model with the updated training data.

20. The method of claim 15, wherein the inclusive prompt recommendation model is trained to recognize patterns in prompts associated with inclusion of the at least one visible human trait, characteristic, and/or condition.

* * * * *